United States Patent
Lin et al.

(10) Patent No.: US 7,961,907 B2
(45) Date of Patent: Jun. 14, 2011

(54) PORTABLE ELECTRONIC DEVICE

(75) Inventors: Chia Ching Lin, Ping Tung County (TW); Li Ying Kuo, Hsin Chu (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 1036 days.

(21) Appl. No.: 11/808,740

(22) Filed: Jun. 12, 2007

(65) Prior Publication Data
US 2008/0124005 A1 May 29, 2008

(51) Int. Cl.
*G06K 9/00* (2006.01)
(52) U.S. Cl. ......... 382/103; 382/107; 382/296; 382/297
(58) Field of Classification Search .................. 382/103, 382/107, 296, 297
See application file for complete search history.

(56) References Cited

U.S. PATENT DOCUMENTS

| | | | |
|---|---|---|---|
| 6,833,857 B2 * | 12/2004 | Hamada | 348/14.02 |
| 2002/0037770 A1 | 3/2002 | Paul et al. | |
| 2006/0146009 A1 * | 7/2006 | Syrbe et al. | 345/156 |

FOREIGN PATENT DOCUMENTS

| WO | WO-03/079179 A1 | | 9/2003 |
|---|---|---|---|
| WO | WO2004066615 | * | 8/2005 |

* cited by examiner

*Primary Examiner* — Tom Y Lu
(74) *Attorney, Agent, or Firm* — Muncy, Geissler, Olds, & Lowe, PLLC

(57) ABSTRACT

A portable electronic device is disclosed. The portable electronic device includes: an image capturing device, for capturing a first image; a focal distance measuring device, for measuring a plurality of focal distances corresponding to a plurality positions of the first image; a display device, for outputting a picture; and a motion detecting controller, for determining variations of the plurality of focal distances measured by the focal distance measuring device when the portable electronic device moves or rotates, and controlling the picture shown in the display device according to the variations of the plurality of focal distances.

14 Claims, 6 Drawing Sheets

US 7,961,907 B2

PORTABLE ELECTRONIC DEVICE

This application claims the benefit of the filing date of Taiwan Application Ser. No. 095120896, filed on Jun. 13, 2006, the content of which is incorporated herein by reference.

BACKGROUND OF THE INVENTION

1. Field of the Invention

The present invention relates to an electronic device, and more particularly, to a portable electronic device capable of browsing a display according to a movement condition or a rotation condition or both the movement and rotation condition of the portable electronic device.

2. Description of the Related Art

Portable electronic products and devices, such as cell phones and PDAs, have remove communications capabilities compatible with remote servers via Internet network connections. In this way, the user of the portable electronic device can easily utilize the portable electronic device to connect to the Internet such that the user can browse a website that is displayed on the display of the portable electronic device, such as a cell phone. This allows the user to transfer information, to search data, or to perform some financial transactions, for example, to buy stocks, through the utilization of the Internet connection. Obviously, the above-mentioned portable electronic devices and products provide a new method of information flow. The portable electronic products allow the user of the device to easily carry and transport the information and thereby make the financial activities of the user more convenient and portable.

Unfortunately, displays utilized by the portable electronic products are often very small. As a result, the user of said device is not able to browse or thereafter view an entire website's page easily. For example, when using a cell phone, the screen of the cell phone can only display a small fraction of a website's page. This means that the user has to use the direction key of the cell phone to move the website displayed by the cell phone such that the user can experience the entire page of the website. However, this is not a good solution for the user to browse the website. Therefore, the portable electronic products need other mechanisms to allow the user to browse the website more conveniently.

U.S. patent No. 2002037770 discloses a method for controlling an image displayed on a screen. The method relates to image processing mechanisms. It utilizes a camera module to detect a motion condition of the user, and control a game (i.e., the display) according to the movement of the user. For example, a cursor can move according to the movement of the user instead of being controlled by an input device such as a mouse or a keyboard.

WO patent No. 2003079179 discloses a similar method as that just described. It utilizes a camera module to detect the movement of the user and correspondingly controls the cursor on the screen such that the traditional input devices are not necessary.

Please note that, the above-mentioned mechanisms are designed for desktop computers and are not suitable for use with the portable electronic devices. The portable electronic devices, because of their very small screen size, require that the user move a picture (e.g., the website's page) shown in the screen very frequently. Therefore, new browsing mechanisms for portable electronic devices are needed.

SUMMARY OF THE INVENTION

In view of the above-mentioned problems, an object of the claimed invention is to provide a portable electronic device capable of performing a browsing control according to a motion condition, a rotation condition, or both, such that the above-mentioned problems could be solved.

According to an embodiment of the claimed invention, a portable electronic device is disclosed. The portable electronic device includes an image capturing device, for capturing a first image; a focal distance measuring device, for measuring a plurality of focal distances corresponding to a plurality positions of the first image; a display device, for outputting a picture; and a motion detecting controller, for determining variations of the plurality of focal distances measured by the focal distance measuring device when the portable electronic device moves, rotates, or both, and controlling the picture shown in the display device according to the variations of the plurality of focal distances.

According to another embodiment of the claimed invention, a method applied for a portable electronic device for browsing control is disclosed. The method includes capturing a first image; measuring a plurality of focal distances respectively corresponding a plurality of positions of the first image; detecting variations of the plurality of focal distances when the portable electronic device moves, rotates, or both, to determine a motion condition, a rotation condition, or both, of the portable electronic device; and controlling a browsing operation of the portable electronic device according to the motion condition, the rotation condition, or both, of the portable electronic device.

According to another embodiment of the claimed invention, a portable electronic device is disclosed. The portable electronic device includes an image capturing device, for capturing a first image before the portable electronic device moves, rotates, or both, and capturing a second image after the portable electronic device moves, rotates, or both; a display device, for outputting a picture; and a motion detecting controller, for comparing the first image and the second image to utilize a comparison result between the first image and the second image as a reference of browsing control of the display device after the portable electronic device moves, rotates, or both.

According to another embodiment of the claimed invention, a method applied for a portable electronic device for browsing control is disclosed. The method includes capturing a first image before the portable electronic device moves, rotates, or both, and capturing a second image after the portable electronic device moves, rotates, or both; and comparing the first image and the second image to utilize a comparison result between the first image and the second image as a reference of browsing control of the portable electronic device.

The claimed invention controls the screen of the portable electronic device according to motion condition or the rotation condition or both conditions of the portable electronic device. As a result, the user does not need to utilize a direction key to, for example, browse the entirety of a website's page. In other words, the claimed invention provides another browsing method, which allows the user can control the screen through moving, rotating, or both moving and rotating of the portable electronic device to browse a picture (e.g., a website).

DETAILED DESCRIPTION OF THE INVENTION

The portable electronic device of the invention will be described with reference to the accompanying drawings.

Figure 1:
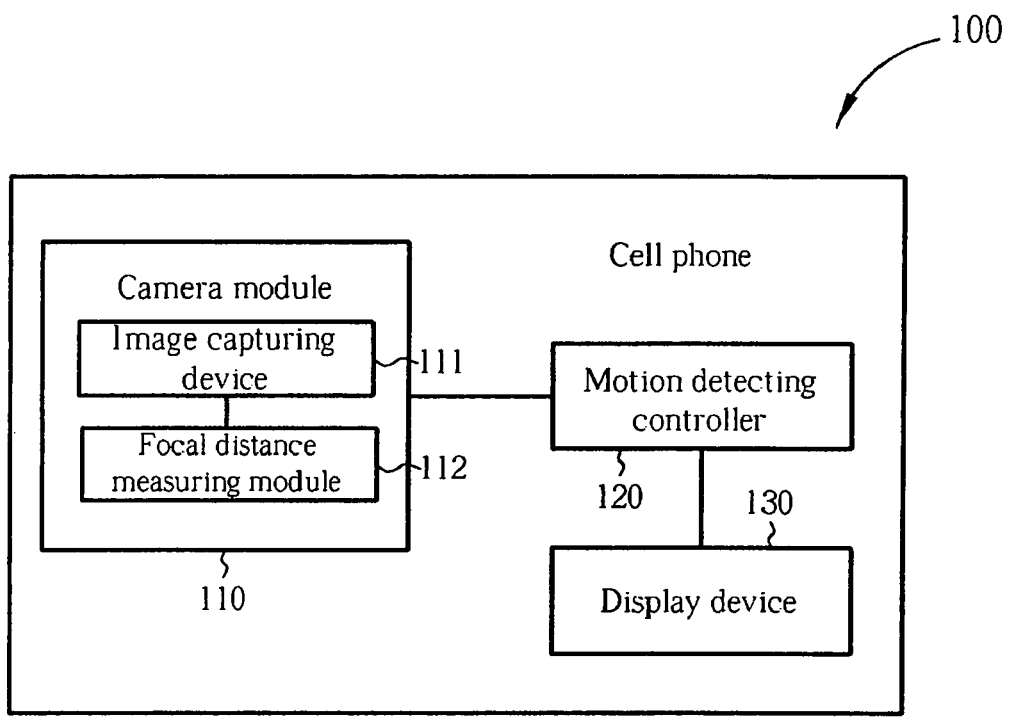
FIG. 1 is a block diagram of a cell phone according to the present invention.

Please refer to FIG. 1, which is a block diagram of a cell phone 100 according to the present invention. As shown in FIG. 1, the cell phone 100 comprises a camera module 110, a motion detecting controller 120, and a display device 130. The camera module 110 comprises an image capturing device 111 and a focal distance measuring module 112. In addition, the focal measuring module 112 is coupled to the image capturing device 111. The motion detecting controller 120 is coupled to the camera module 110 and the display device 130. It is noted that, the cell phone can further comprise an antenna module and a signal processing circuit (not shown in FIG. 1) to provide communication functions of the cell phone 100. However, the operation and function of the antenna module and the signal processing circuit are well known, and thus omitted herein.

In order to provide a better method for a user to browse a picture or a website utilizing the display device 130, the present invention controls the screen (e.g., picture or website) in the display device 130 according to the motion/rotation condition (i.e., motion condition, rotation condition, or both conditions together) of the cell phone 100. In other words, the user only has to move the cell phone 100 such that the user can equivalently browse the picture (e.g., to move the picture up or down) shown in the display device 130 through the movement of the cell phone 100.

In this embodiment of the present invention, the motion detecting controller 120 can utilize the focal distances detected by the focal distance measuring module 112 or the images captured by the image captured module 111 as a reference of the motion/rotation condition of the cell phone 100 such that the motion detecting controller 120 can further utilize the reference to control the picture shown in the display device 130.

Figure 2:
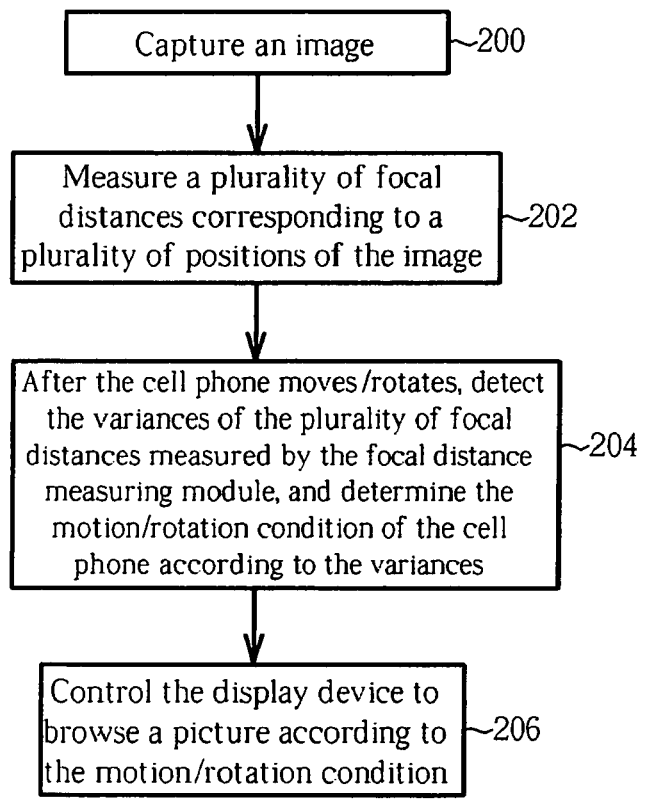
FIG. 2 is a flow chart of a first embodiment of the operation of the cell phone shown in FIG. 1.

Please refer to FIG. 2, which is a flow chart of a first embodiment of the operation of the cell phone 100 shown in FIG. 1. It comprises the following steps:

Step 200: The image capturing device 111 captures an image;

Step 202: The focal distance measuring module 112 continuously measures a plurality of focal distances corresponding to a plurality of positions of the image;

Step 204: After the cell phone 100 moves/rotates, the motion detecting controller 120 detects the variances of the plurality of focal distances measured by the focal distance measuring module 112, and determines the motion/rotation condition of the cell phone 100 according to the variances;

Step 206: The motion detecting controller 120 controls the display device 130 to browse a picture according to the motion/rotation condition of the cell phone 100.

Figure 3:
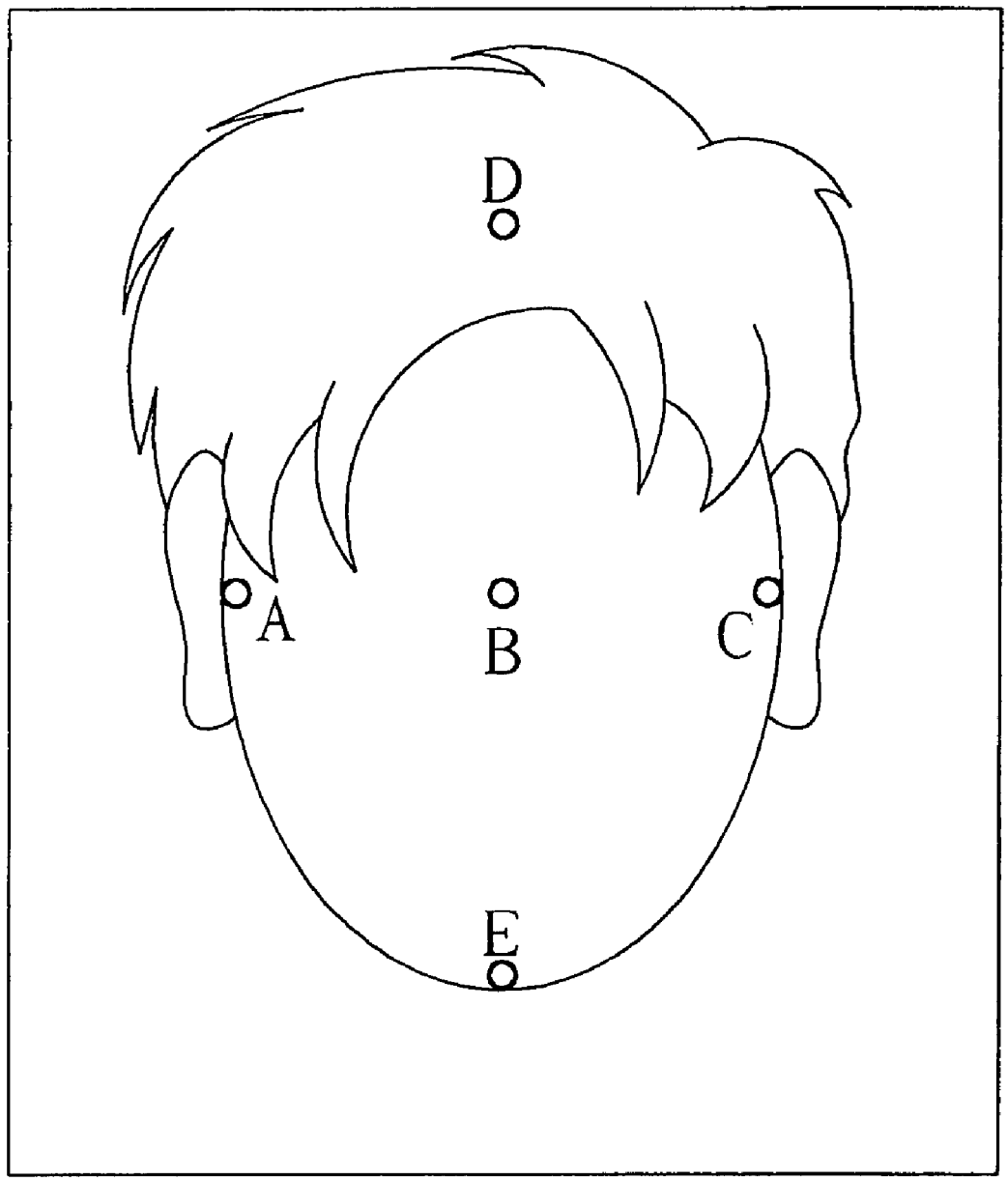
FIG. 3 is a diagram of an image captured by the image capturing device shown in FIG. 1.

First, the image capturing device 111 of the camera module 110 captures an image (step 200), and the focal distance measuring module 112 determines a plurality of positions, to be measured, of the image and measures the focal distances corresponding to the positions to be measured. Please refer to FIG. 3, which is a diagram of a captured image captured by the image capturing device 111 shown in FIG. 1. As shown in FIG. 3, it is assumed that the captured image is a face of a user. Furthermore, in this embodiment of the present invention, the focal distance measuring module 112 can measure the focal distances of a plurality of points of the image (e.g., the five points A through E on the face of the user as shown in FIG. 3).

Figure 4:
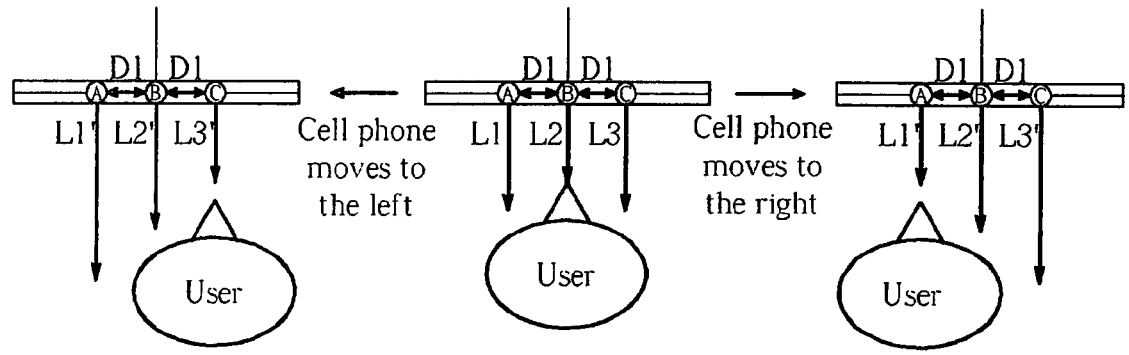
FIG. 4 illustrates the variances of the focal distances when the cell phone moves horizontally.

Please refer to FIG. 4, which illustrates the variances of the focal distances when the cell phone 100 moves horizontally. Here, the focal distances of the points A through C respectively correspond to L1 through L3 (where the distances between the points A and B and between the points A and C are both Dl). When the cell phone 100 moves to the right or moves to the left, the focal distances L1, L2, and L3 vary correspondingly. As shown in FIG. 4, when the cell phone 100 moves to the right, the focal distance L3 becomes larger. Additionally, even the length of the focal distance L3 may measure to infinity. On the other hand, when the cell phone 100 moves to the left, the focal distance L1 may measure to infinity. Therefore, in this embodiment of the present invention, the motion detecting controller 120 detects the variances of the plurality of focal distances L1, L2, and L3, which are measured by the focal distance measuring module 112, for determining the motion condition of the cell phone (step 204) to further control the display condition of the display device 130 (step 206). For example, when the motion detecting controller 120 detects that the focal distance L3 corresponds to an infinite value, the motion detecting controller 120 determines that the cell phone 100 is moving to the right such that the motion detecting controller 120 controls the display condition (e.g., the motion detecting controller 120 can control the website that is being browsed to move correspondingly or control the cursor to move correspondingly) of the display device 130.

Figure 5:
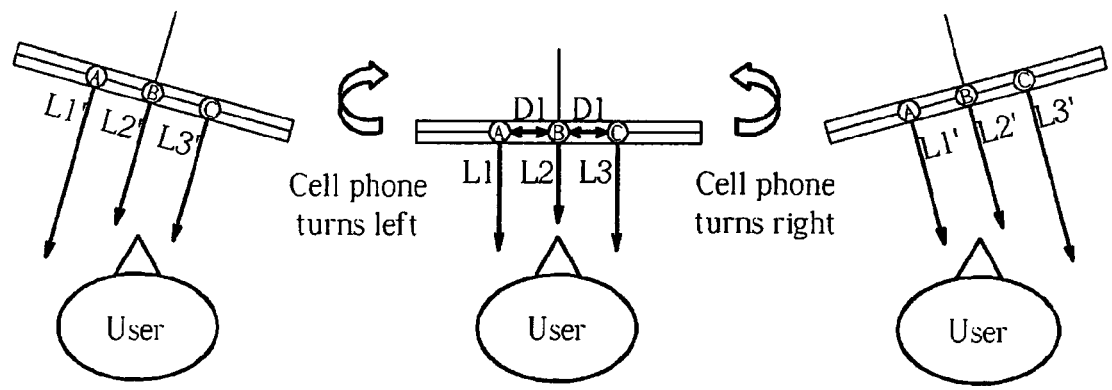
FIG. 5 illustrates the variances of focal distances when the cell phone rotates.

Please refer to FIG. 5, which illustrates the variances of focal distances when the cell phone 100 rotates. Similarly, the focal distances L1 through L3 respectively correspond to points A through C. When the cell phone 100 turns right or left (i.e., rotates), the focal distances L1 through L3 vary correspondingly. As shown in FIG. 5, when the cell phone 100 turns right, the focal distance L3 becomes infinity. On the other hand, when the cell phone 100 turns left, the focal distance L1 becomes infinity. Therefore, in this embodiment of the present invention, the motion detecting controller 120 can also detects the variances of the focal distances L1 through L3 for determining the rotation condition of the cell phone 100 (step 204) to further control the display condition of the display device 130. From the above disclosure, it can be seen that the present invention can perform the browsing control of the display device 130 according to the variances of the focal distances caused by the motion/rotation of the cell phone 100.

From the above disclosure, it can be seen that the motion detecting controller 120 is capable of evaluating the entire motion/rotation condition (including the motion/rotation in all directions) of the cell phone 100 according to the variances of the focal distances corresponding to the five points A through E. Please note that the present invention does not limit the number and the positions of the points. For example, the focal distance measuring device 112 can measure the focal distances of more points than are disclosed herein. This allows the motion detecting controller 120 to achieve a better resolution when the motion detecting controller 120 evaluates the motion/rotation condition of the cell phone 100. This change also obeys the spirit of the present invention.

In addition, the cell phone 100 can control the picture (e.g., the website's page) shown in the display device 130 through horizontal movement. In the actual implementation, the present invention cell phone 100 can additionally change the size of the picture. Specifically, the picture's size can be increased or decreased (i.e., zoom in or zoom out) according to the distance between the user and the cell phone 100. For example, the user can situate or otherwise relocate/move the cell phone 100 far from the user or closer to the user in order to control the scaling degree of the picture. For example, in this embodiment, the motion detecting controller 120 monitors the focal distances measured by the focal distance measuring module 112. If the motion detecting controller 120 detects that the focal distances of the points A through E all become shorter, this means that the cell phone 110 is getting closer to the user. Therefore, the motion detecting controller 120 can control the display device 130 to correspondingly change the display scale of the picture (e.g., such as scaling the picture to appear larger). On the other hand, if the motion detecting controller 120 detects that the focal distances of the points A through E all become larger, this means that the distance between the cell phone 110 and the user is getting larger. Therefore, the motion detecting controller 120 can control the display device 130 to correspondingly change the display scale of the picture (e.g., such as scale down the picture).

Figure 6:
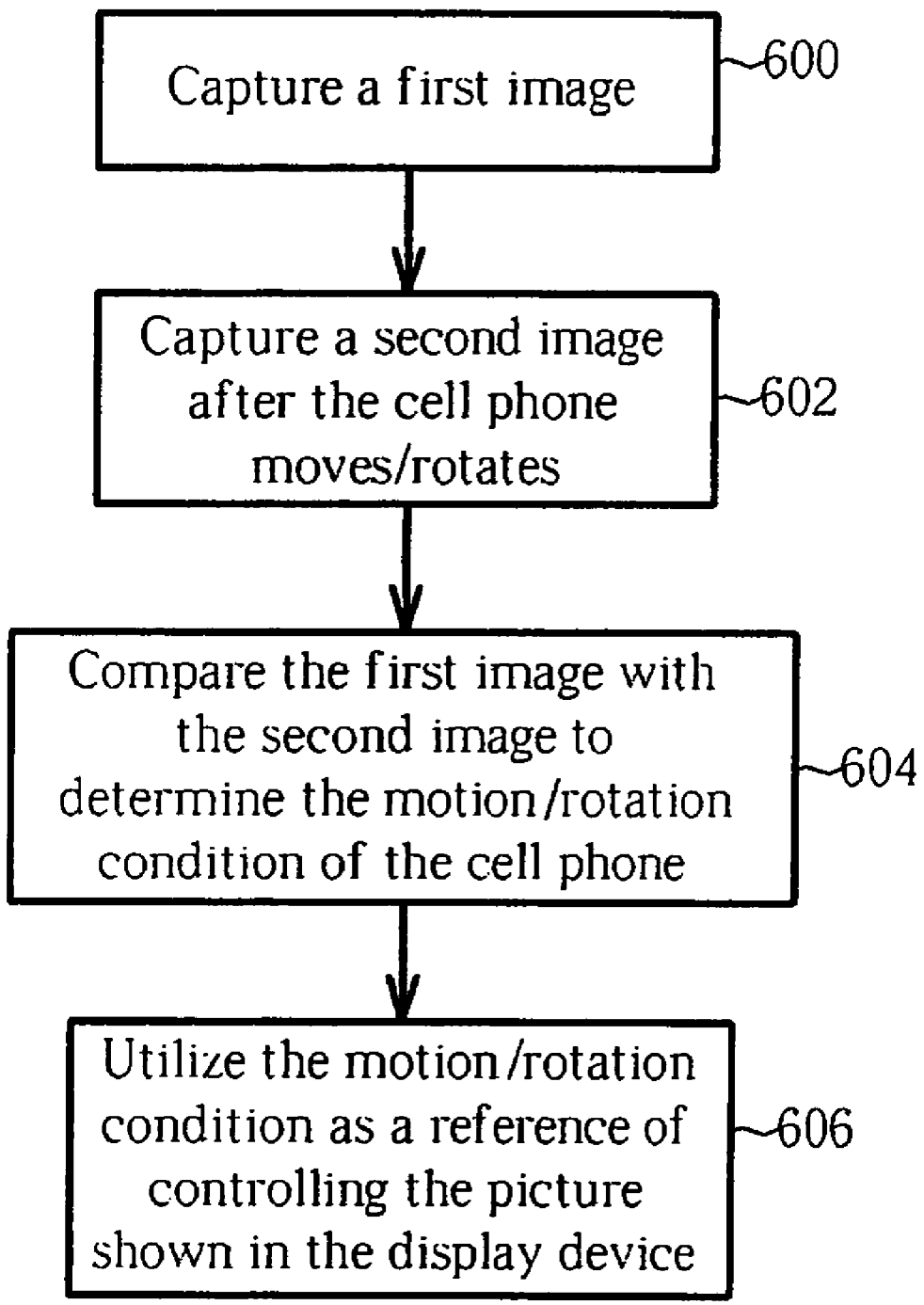
FIG. 6 is a flow chart of a second embodiment of the operation of the cell phone.

In the above disclosure, the motion detecting controller 120 utilizes the variances of the focal distances as a reference of the motion condition of the cell phone 100. However, the present invention does not limit the detection mechanism of the motion detecting controller 120. Please refer to FIG. 6, which is a flow chart of a second embodiment of the operation of the cell phone 100. It comprises the following steps:

Step 600: The image capturing device 111 captures a first image;

Step 602: The image capturing device 111 captures a second image after the cell phone 100 moves/rotates;

Step 604: The motion detecting controller 120 compares the first image and the second image to determine the motion/rotation condition of the cell phone 100;

Step 606: The motion detecting controller 120 utilizes the motion/rotation condition as a reference of controlling the picture shown in the display device 130.

In this embodiment, the image capturing device 111 captures an image before the cell phone 100 moves/rotates (step 600), and captures another image after the cell phone 100 moves/rotates (step 602). Thereafter, the motion detecting controller 120 analyzes the variance between the first image and the second image to determine the motion/rotation condition of the cell phone 100 (step 604). The motion detecting controller 120 utilizes the motion/rotation condition of the cell phone 100 as a reference of controlling the picture of the display device 130 (step 606).

Figure 7:
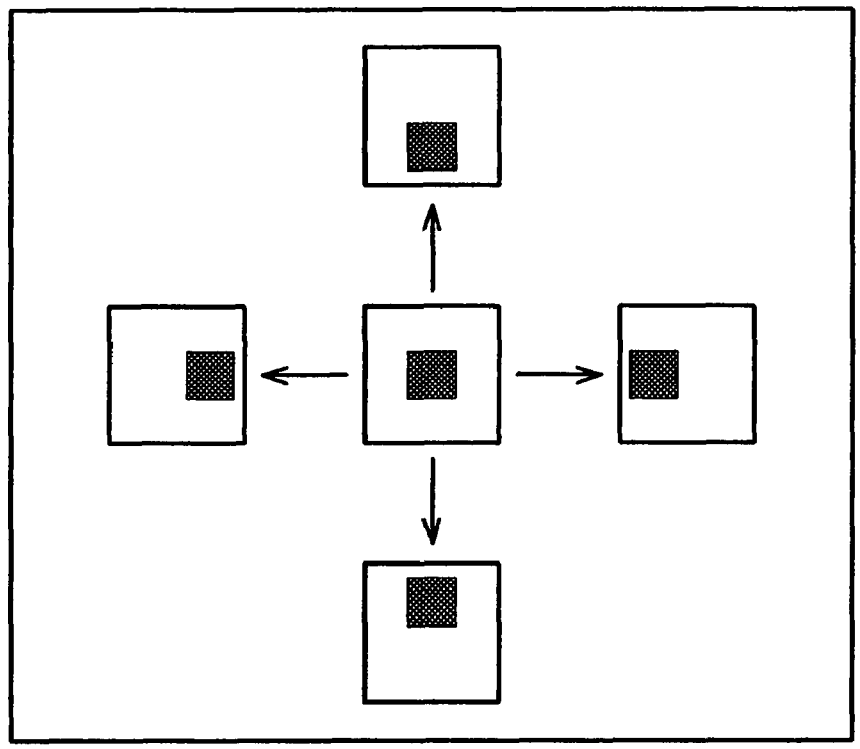
FIG. 7 illustrates the variances between the images captured by the image capturing device when the cell phone moves.

Please refer to FIG. 7, which illustrates the variances between the images captured by the image capturing device 111 when the cell phone 100 moves. Here, we assume that the central block, which is labeled by slope lines, is regarded as a region to be analyzed. If the cell phone 100 moves upward, the central block correspondingly moves downward. Similarly, if the cell phone 100 moves downward, the central block of the image moves upward accordingly. Similarly, if the cell phone 100 moves to the left, the central block of the image moves to the left. And if the cell phone 100 moves to the right, the central block of the image moves to the left.

Figure 8:
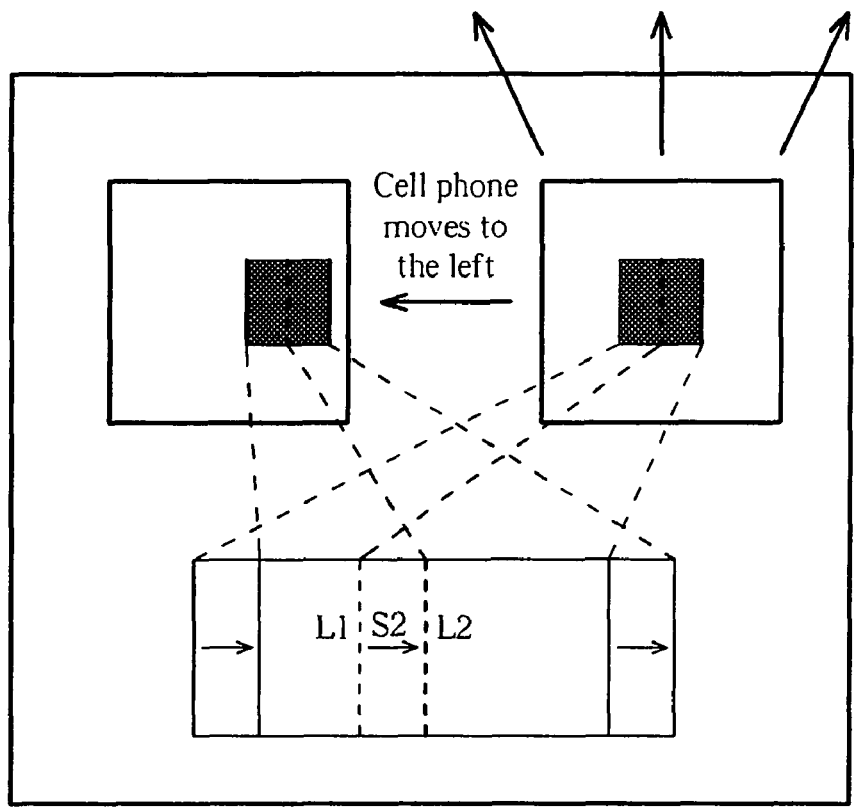
FIG. 8 illustrates how to detect the motion condition of the cell phone through comparing images.

Therefore, the motion detecting controller 120 can analyze the above-mentioned slope line block to detect the motion condition of the cell phone 100. For example, please refer to FIG. 8. Assuming that the cell phone 100 moves to the left, the central block moves S2 to the right. Therefore, in this embodiment, the motion detecting controller 120 can detect the motion condition of the cell phone 100 through comparing a line segment of the central block. For example, the motion detecting controller 120 compares each line segment from the dotted line L1 to the right or to the left. Until the motion detecting controller 120 compares the dotted line L1 with a certain line (e.g., the dotted line L2), where the distance between them is S2, the motion detecting controller 120 can determine that the similarity is larger than a predetermined degree. Next, the motion detecting controller 120 determines that the cell phone 100 is moving to the right. Similarly, assume that the cell phone 100 moves to the right. The motion detecting controller 120 also searches for a similar line from the dotted line L1 to the left/right. If the motion detecting controller 120 discovers that the similarity of another line segment and the dotted line L1 is larger than a certain degree, the motion detecting controller 120 determines that the cell phone 100 moved to the right. In this embodiment, in order to increase the efficiency of motion detecting controller 120, the searching range of the motion detecting controller 120 can be predetermined (e.g., the motion detecting controller 120 can be set to search only within 100 pixels to either the left or right) to allow the motion detecting controller 120 to determine the motion condition of the cell phone 100 more quickly.

Similarly, the motion detecting controller 120 can also determine whether the cell phone 100 moves upward or downward utilizing a horizontal line segment of the central block and searching for a similar line segment upward/downward.

Please note that, in the above-mentioned embodiment of the present invention, the motion detecting controller 120 attempts to detect a corresponding line segment in the image captured after the cell phone 100 moves. However, the above-mentioned searching mechanism is only regarded as an embodiment, and not a limitation of the present invention. For instance, the motion detecting controller 120 can directly search for a corresponding block in the images corresponding to the original central block until the motion detecting controller 120 discovers that the similarity between a certain block and the original central block is larger than a certain predetermined degree. And then, the motion detecting controller 120 can determine the motion condition of the cell phone 100 according to the positions of the corresponding block and the central block. Furthermore, regardless of the method utilized by the motion detecting controller 120: searching for a corresponding line segment or a corresponding block, those skilled in the art can easily understand said comparison operations. For example, the motion detecting controller 120 can compare the pixel values of the original line segment with the pixel values of another line segment. When the similarities of the pixel values of the original line segment and a certain line segment are larger than a predetermined threshold, the motion detecting controller 120 can regard the certain line segment as a moving result of the original line segment. Similarly, the motion detecting controller 120 can determine the motion condition of the cell phone 100 according to the movement between the certain line segment and the original line segment, and then control the picture shown in the display device 130 according to the motion condition of the cell phone 100.

Figure 9:
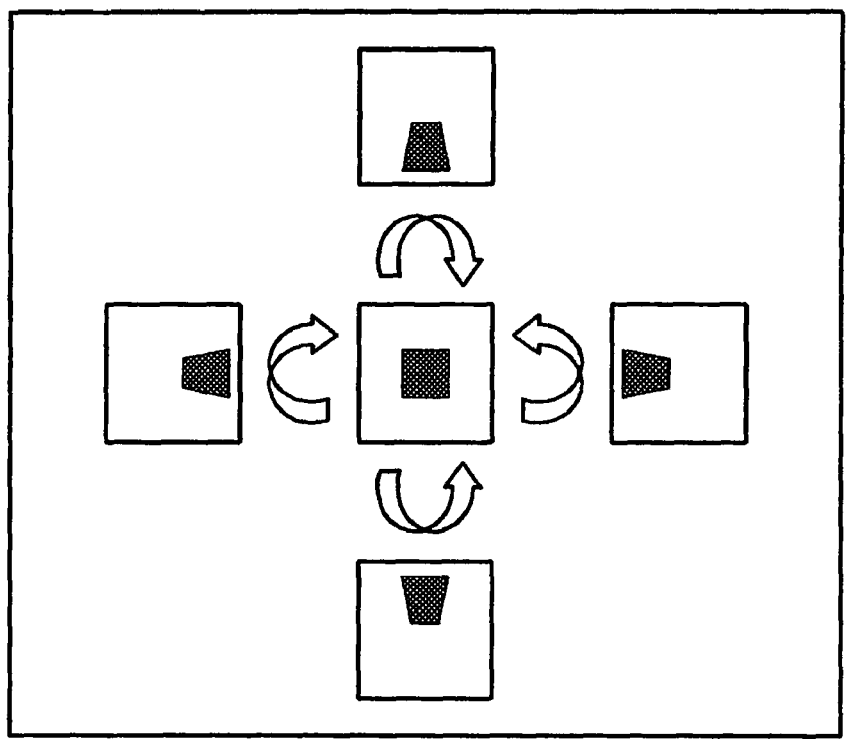
FIG. 9 illustrates variances of the captured images when the cell phone rotates.

Moreover, assuming that control mechanism is to rotate the cell phone 100 to control the picture shown in the display device 130, as is known, the captured image after the cell phone 100 rotates will be a slightly different from that before the cell phone 100 rotates. Please refer to FIG. 9, which illustrates variances of the captured images when the cell phone 100 rotates. Similarly, we assume that the central block, which is labeled by slope lines, is regarded as a region to be analyzed. If the cell phone 100 turns upward, the central block of the image moves downward and the shape of the central block is changed from a square into a trapezoid. These two events take place because the lens of the image capturing module 111 also turns downward such that the captured image is twisted (i.e., transformed). On the other hand, if the cell phone 100 turns downward, the central block (note: labeled by the slope lines) moves upward and the captured image is twisted (i.e., transformed) into a reversed trapezoid.

Similar to the above-mentioned embodiment, the motion detecting controller 120 can perform the detection based on a specific line segment or the entire central block to determine the rotation condition of the cell phone 100. Unlike the above-mentioned embodiment, in present embodiment the captured image has some distortions after rotation, therefore when the images are compared, some parameters related to the distortion need to be considered. The related operations are well known to those having average skill in the art and they are thus omitted herein.

Figure 10:
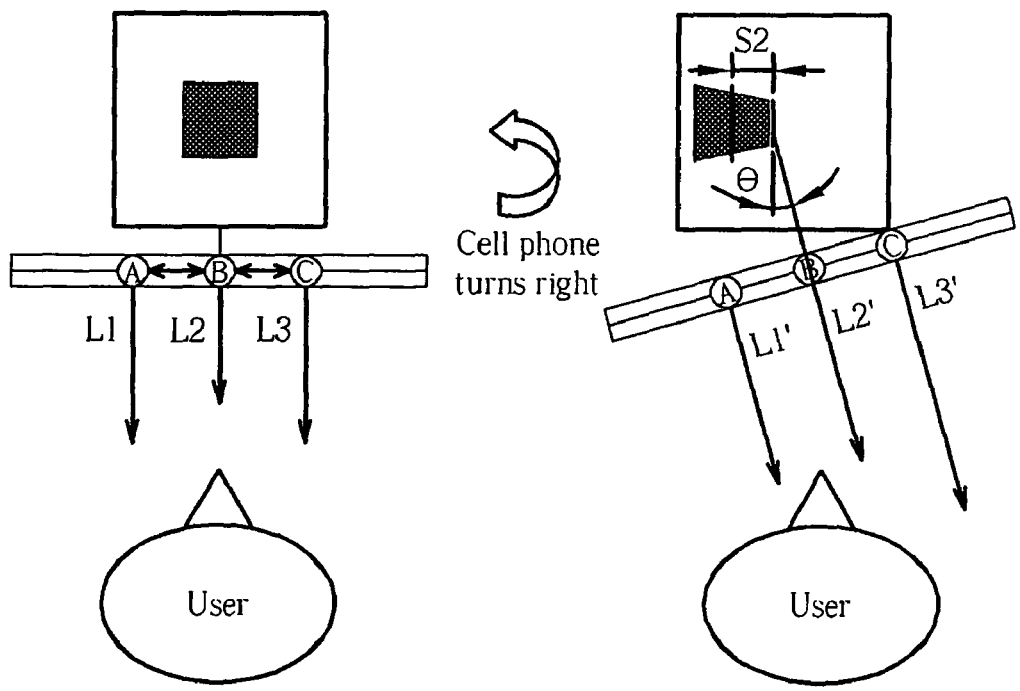
FIG. 10 illustrates how to simultaneously utilize the focal distances and images to determine the motion condition, rotation condition, or both, of the cell phone.

In the above disclosure, the focal distance or the images are compared to determine the motion/rotation condition of the cell phone 100. However, the present invention can combine the aforementioned two methods to evaluate the motion/rotation condition of the cell phone 100. Please refer to FIG. 10, which illustrates how to simultaneously utilize the focal distances and images to determine the motion/rotation condition of the cell phone 100. As mentioned previously, when the cell phone 100 rotates, the focal distances change and the central block of the image moves to the left and the shape of the image is twisted. Take the central point B of the image for example, before the cell phone 100 rotates, the focal distance of the point B is L2, but after the cell phone 100 rotates, the focal distance of the point B becomes L2'. Therefore, the rotation angle θ of the cell phone 100 can be calculated according to the following equation (1).

$$\theta = \cos^{-1}(L2/L2') \quad \text{equation (1)}$$

Furthermore, the calculated angle θ and the following equation (2) can be utilized to roughly evaluate the movement S2 of the image:

$$S2 = L2' \times \sin\theta \quad \text{equation (2)}$$

After the movement S2 is evaluated, the motion detecting controller 120 can perform the above-mentioned image comparison operations according to the distance S2. In other words, the image detecting controller 120 can search for a certain line segment (i.e., central block), having the best similarity to the original line segment, from a predicted position, where the distance between the central point and the predicted position is S2. Next, after the line segment having the best similarity is determined, the motion detecting controller 120 can correctly determine the rotation condition of the cell phone 100 according to the distance between the original line segment and the corresponding line segment having the best similarity. Please note that, because the motion detecting controller 120 can roughly evaluate the position of the corresponding line segment (i.e., the detected block) having the best similarity, this can save significant searching time formerly required by the motion detecting controller 120. For example, the motion detecting controller 120 originally has to detect at least the length S2 such that the motion detecting controller 120 is able to discover the corresponding line segment. However, because the position of the corresponding line segment is roughly evaluated (i.e., estimated), the motion detecting controller 120 only needs to search in a small range. Obviously, this increases the efficiency of the motion detecting controller 120.

As is well known, the cell phone 100 often comprises a processor and a storage device. The storage device often stores firmware (e.g., program codes) for controlling component devices of the cell phone 100. Therefore, in a preferred embodiment of the present invention, the motion detecting controller 120 is implemented by the processor executing firmware. In other words, the motion detecting controller 120 is not limited by the present invention as being realized via hardware. Instead, in the actual implementation, the motion detecting controller 120 can be the firmware stored inside the storage device, and the processor executes the firmware to perform the operations (e.g., image detection, image comparison, and display device control) of the motion detecting controller 120.

Please note that, in the above disclosure, the cell phone 100 is utilized as an embodiment, not a limitation of present invention. In other words, the present invention can be utilized in all kinds of portable electronic devices to provide a convenient browsing method for the user.

In contrast to the prior art, the present invention utilizes the motion/rotation condition of the cell phone as the reference to control the picture shown in the display device. Therefore, the user does not need to utilize a direction key to browse. In other words, the present invention provides an alternate browsing method, which allows the user to control the screen through moving/rotating of the portable electronic device to browse a picture or a website.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those having ordinarily skill in the art.

What is claimed is:

1. A portable electronic device comprising:
   an image capturing device, for capturing a first image;
   a focal distance measuring device, coupled to the image capturing device, for measuring a plurality of focal distances corresponding to a plurality of positions of the first image respectively;
   a display device, for outputting a picture; and
   a motion detecting controller, coupled to the focal distance measuring device, for determining variations of the plurality of focal distances measured by the focal distance measuring device when the portable electronic device moves or rotates and controlling the picture according to the variations of the plurality of focal distances.

2. The portable electronic device of claim 1, wherein when the motion detecting controller determines that the plurality of focal distances are all shortened, the motion detecting controller controls the display device to scale up the picture, and when the motion detecting controller determines that the plurality of focal distances are all lengthen, the motion detecting controller controls the display device to scale down the picture.

3. The portable electronic device of claim 1, wherein the image capturing device captures a second image after the portable electronic device moves or rotates, and the motion detecting controller is further coupled to the image capturing device, for comparing the first image and the second image as a reference to control the picture shown in the display device.

4. The portable electronic device of claim 3, wherein the motion detecting controller determines a specific region from the first image, and searches for the specific region from the second image compare the corresponding movement between the specific regions of the first image and the second image as the reference.

5. The portable electronic device of claim 3, wherein the motion detecting controller determines at least one specific region from the first image, and searches for a corresponding region, having a best similarity to the specific region, from the second image to utilize the corresponding movement between the specific regions of the first image and the second image as the reference of the comparison result.

6. The portable electronic device of claim 4, wherein the specific region and the corresponding specific region are respectively a first line segment and a second line segment, and the motion detecting controller compares pixel values of the first line segment and the second line segment such that the motion detecting controller is capable of determining motion direction and rotation direction of the portable electronic device to control the picture when a similarity of the pixel values of the first line segment and the second line segment is larger than a predetermined threshold.

7. A method applied for a portable electronic device for browsing control, the method comprising:
   capturing a first image;
   measuring a plurality of focal distances respectively corresponding to a plurality of positions of the first image;
   detecting variations of the plurality of focal distances when the portable electronic device moves or rotates to determine a motion/rotation condition of the portable electronic device; and
   controlling a browsing operation of the portable electronic device according to the motion/rotation condition.

8. The method of claim 7, further comprising:
   scaling up a picture when browsing if the plurality of focal distances are all shortened and scaling down a picture when browsing if the plurality of focal distances are all lengthen.

9. The method of claim 7, further comprising:
   capturing a second image after the portable electronic device moves/rotates; and
   comparing the first image and the second image as a reference of the motion/rotation condition.

10. The method of claim 9, wherein the step of comparing the first image and the second image comprises:
    determining at least one specific region from the first image, and searching the specific region from the second image to utilize the corresponding movement of the specific regions of the first image and the second image as the reference.

11. The method of claim 9, wherein the motion detecting controller determines at least one specific region and searches for a corresponding specific region having a best similarity relating to the specific region, to utilize a corresponding movement between the specific region of the first image and the corresponding specific region of the second image as the reference.

12. The method of claim 11, wherein the specific region and the corresponding specific region are respectively a first line segment and a second line segment, and the method further comprising:
    comparing pixel values of the first line segment and the second line segment for determining the motion/rotation direction to control the browsing when a similarity of the pixel values of the first line segment and the second line segment is larger than a predetermine threshold.

13. A portable electronic device comprising:
    an image capturing device, for capturing a first image before the portable electronic device moves/rotates and capturing a second image after the portable electronic device moves/rotates;
    a display device, for outputting a picture; and
    a motion detecting controller, coupled to the image capturing device and the display device, for comparing the first image and the second image as a reference to control the display device for browsing after the portable electronic device moves/rotates,
    wherein the motion detecting controller determines at least one specific region from the first image, and searches for a corresponding specific region, having a best similarity to the specific region, from the second image to utilize the corresponding movement between the specific regions of the first image and the second image as the reference,
    wherein, the specific region and the corresponding region are respectively a first line segment and a second line segment, and the motion detecting controller compares pixel values of the first line segment and the second line segment for determining a motion/rotation direction of the portable electronic device to control the picture when a similarity of the pixel values of the first line segment and the second line segment is larger than a predetermined threshold.

14. A method of a portable electronic device for browsing control, the method comprising:
    capturing a first image before the portable electronic device moves/rotates and capturing a second image after the portable electronic device moves/rotates; and
    comparing the first image and the second image as a reference to control browsing of the portable electronic device, comprising:
    determining at least one specific region from the first image, and searching for a corresponding specific region, having a best similarity to the specific region, from the second image to utilize the corresponding movement between the specific regions of the first image and the second image as the reference, wherein the specific region and the corresponding region are respectively a first line segment and a second line segment;
    comparing pixel values of the first line segment and the second line segment for determining the motion/rotation direction to control the browsing when a similarity of the pixel values of the first line segment and the second line segment is larger than a predetermine threshold.

* * * * *